US009641268B2

(12) United States Patent
Li et al.

(10) Patent No.: US 9,641,268 B2
(45) Date of Patent: May 2, 2017

(54) METHOD, SYSTEM AND DEVICE FOR SYNCHRONIZING CLOCKS

(71) Applicant: Huawei Technologies Co., Ltd., Shenzhen (CN)

(72) Inventors: Hao Li, Shenzhen (CN); Jun Xing, Shenzhen (CN); Xiaoyu Tang, Shenzhen (CN); Qixiang Zhong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/671,975

(22) Filed: Mar. 27, 2015

(65) Prior Publication Data
US 2015/0207580 A1    Jul. 23, 2015

Related U.S. Application Data

(63) Continuation of application No. PCT/CN2013/082897, filed on Sep. 4, 2013.

(30) Foreign Application Priority Data

Sep. 28, 2012 (CN) .......................... 2012 1 0370446

(51) Int. Cl.
G01R 31/08 (2006.01)
H04L 12/28 (2006.01)
(Continued)

(52) U.S. Cl.
CPC .......... *H04J 3/0679* (2013.01); *H04J 3/0641* (2013.01)

(58) Field of Classification Search
CPC ....... H04J 3/0679; H04J 3/0641; H04J 3/0682
See application file for complete search history.

(56) References Cited

U.S. PATENT DOCUMENTS 4,142,069 A * 2/1979 Stover ................... H04J 3/0679
370/507
6,163,551 A 12/2000 Wolf
(Continued)

FOREIGN PATENT DOCUMENTS

CN 101119192 A 2/2008
CN 101272210 A 9/2008
(Continued)

OTHER PUBLICATIONS

"Transmission and Multiplexing (TM); Synchronization network engineering," Draft ETSI EG 201 793, V1.1.1, pp. 1-86, ETSI, Sophia Antipolis, France (Apr. 2000).
(Continued)

Primary Examiner — Faruk Hamza
Assistant Examiner — Abu-Sayeed Haque
(74) Attorney, Agent, or Firm — Leydig, Voit & Mayer, Ltd.

(57) ABSTRACT

A method for synchronizing clocks, including: receiving at least two clock signals, where the at least two clock signals are sent by a bidirectional clock tracking link respectively corresponding thereto; setting two or more clock signals coming from a same network element into a same clock source group; selecting one clock signal in a same clock source group as a currently tracked clock signal; and if the currently tracked clock signal belongs to the clock source group, respectively sending a standby clock signal carrying quality-level do not use information by using the bidirectional clock tracking link respectively corresponding to each of the clock signals in the clock source group. The present invention achieves the effect that in the scenario where there are two or more bidirectional clock tracking links between two network elements, a clock tracking loop will not be generated.

14 Claims, 9 Drawing Sheets

(51) Int. Cl.
*H04B 7/005* (2006.01)
*H04L 12/50* (2006.01)
*H04J 3/06* (2006.01)

(56) References Cited

U.S. PATENT DOCUMENTS

| | | | |
|---|---|---|---|
| 6,185,216 B1 | 2/2001 | Chapman | |
| 6,606,362 B1 | 8/2003 | Dalzell et al. | |
| 6,707,828 B1 | 3/2004 | Wolf | |
| 6,822,975 B1* | 11/2004 | Stroll | H04J 3/085 370/538 |
| 7,139,264 B1 | 11/2006 | Slater | |
| 2005/0025145 A1* | 2/2005 | Rakib | H04J 3/0682 370/389 |
| 2005/0058149 A1* | 3/2005 | Howe | H04L 47/10 370/428 |
| 2009/0207863 A1* | 8/2009 | Cheng | H04J 3/0641 370/498 |
| 2010/0020787 A1 | 1/2010 | Ji et al. | |
| 2010/0229034 A1* | 9/2010 | Kanaya | G06F 1/04 714/10 |
| 2011/0158120 A1* | 6/2011 | Hamasaki | H04J 3/0641 370/252 |
| 2012/0087453 A1 | 4/2012 | Gao | |
| 2013/0283174 A1* | 10/2013 | Faridian | H04J 3/0641 715/736 |

FOREIGN PATENT DOCUMENTS

| | | |
|---|---|---|
| CN | 101286835 A | 10/2008 |
| CN | 101825917 A | 9/2010 |
| CN | 101931524 A | 12/2010 |
| CN | 102006158 A | 4/2011 |
| CN | 102158412 A | 8/2011 |
| CN | 102208958 A | 10/2011 |
| EP | 1096709 A2 | 5/2001 |
| GB | 2301991 A | 12/1996 |
| JP | H09219687 A | 8/1997 |
| JP | H10271100 A | 10/1998 |
| JP | H11506591 A | 6/1999 |
| JP | 2000216741 A | 8/2000 |
| JP | 2010219850 A | 9/2010 |
| WO | WO 9837651 A1 | 8/1998 |

OTHER PUBLICATIONS

"Series G: Transmission Systems and Media, Digital Systems and Networks; Packet Over Transport Aspects—Quality and Availability Targets; Series Y: Global Information Infrastructure, Internet Protocol Aspects and Next-Generation Networks; Internet Protocol Aspects—Transport; Distribution of Timing Information Through Packet Networks; Amendment 1: Use of Synchronous Ethernet in a Multi-Operator Context," Recommendation ITU-T G.8264/Y.1364, pp. i-4, International Telecommunication Union, Geneva, Switzerland (Sep. 2010).

"Series G: Transmission Systems and Media, Digital Systems and Networks; Packet Over Transport Aspects—Quality and Availability Targets; Series Y: Global Information Infrastructure, Internet Protocol Aspects and Next-Generation Networks; Internet Protocol Aspects—Transport; Timing Characteristics of a Synchronous Ethernet Equipment Slave Clock," Recommendation ITU-T G.8262/Y.1362, pp. i-26, International Telecommunication Union, Geneva, Switzerland, (Jul. 2010).

"Series G: Transmission Systems and Media, Digital Systems and Networks; Packet Over Transport Aspects—Quality and Availability Targets; Series Y: Global Information Infrastructure, Internet Protocol Aspects and Next-Generation Networks; Internet Protocol Aspects—Transport; Timing and Synchronization Aspects in Packet Networks," Recommendation ITU-T G.8261/Y.1361, pp. i-102, International Telecommunication Union, Geneva, Switzerland (Apr. 2008).

"Series G: Transmission Systems and Media, Digital Systems and Networks; Digital Networks—Design Objectives for Digital Networks; Timing Characteristics of SDH Equipment Slave Clocks (SEC); Corrigendum 1," ITU-T Recommendation G.813, pp. i-2, International Telecommunication Union, Geneva, Switzerland (Jun. 2005).

"Series G: Transmission Systems and Media, Digital Systems and Networks; Digital Networks—Design Objectives for Digital Networks; Timing Requirements of Slave Clocks Suitable for Use as Node Clocks in Synchronization Networks," ITU-T Recommendation G.812, pp. i-38, International Telecommunication Union, Geneva, Switzerland (Jun. 2004).

"Series G: Transmission Systems and Media, Digital Systems and Networks; Digital Transmission Systems—Digital Networks—Design Objectives for Digital Networks; Timing Characteristics of Primary Reference Clocks," ITU-T Recommendation G.811, pp. i-4, International Telecommunication Union, Geneva, Switzerland (Sep. 1997).

"Series G: Transmission Systems and Media, Digital Systems and Networks; Digital Terminal Equipments—Principal Characteristics of Multiplexing Equipment for the Synchronous Digital Hierarchy; Synchronization Layer Functions; Corrigendum 1," Recommendation ITU-T G.781, pp. i-2, International Telecommunication Union, Geneva, Switzerland (Nov. 2009).

"IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access Method and Physical Layer Specifications; Corrigendum 1: Timing Considerations for PAUSE Operation," IEEE Computer Society, pp. 1-12, Institute of Electrical and Electronics Engineers, New York, New York (Feb. 1, 2010).

Office Action in corresponding Chinese Patent Application No. 201210370446.4 (Dec. 14, 2016).

* cited by examiner

METHOD, SYSTEM AND DEVICE FOR SYNCHRONIZING CLOCKS

CROSS-REFERENCE TO RELATED APPLICATIONS

This application is a continuation of International Patent Application No. PCT/CN2013/082897, filed on Sep. 4, 2013, which claims priority to Chinese Patent Application No. 201210370446.4, filed on Sep. 28, 2012, both of which are hereby incorporated by reference in their entireties.

TECHNICAL FIELD

The present invention relates to the field of communications and, in particular, to a method, a system and a device for synchronizing clocks.

BACKGROUND

Clock synchronization is the main technology in a digital network for achieving network synchronization, and usually a master-slave synchronization mode is adopted. A series of hierarchical clocks are adopted in the master-slave synchronization mode, where a clock at each level is synchronized with a clock at a higher level, the clock at the highest level is usually referred to as a master clock, while the clock at a lower level is usually referred to as a slave clock.

In the clock synchronization process, the generation of a clock tracking loop needs to be prevented especially. The so-called clock tracking loop refers to a phenomenon of tracking, from the clock, a clock signal directly or indirectly coming from itself. In the prior art, quality level do not use information QL_DNU in a standard SSM (Synchronization Status Message, synchronization status message) is usually used for preventing the generation of the clock tracking loop, i.e. a reverse sending DNU (Do Not Use) function suggested in ITU-T standard G.8264 and G.781. The SSM shows a clock quality level, and the clock quality level is divided into five levels:

| Quality Level (QL) | SSM Lower 4 bits Coding [MSB . . . LSB] | Priority |
|---|---|---|
| QL-PRC | 0010 | highest |
| QL-SSU-A | 0100 | higher |
| QL-SSU-B | 1000 | high |
| QL-SEC/EEC | 1011 | low |
| QL-DNU | 1111 | Lowest (This quality level cannot be used for synchronization) |

The above five clock quality levels arranged sequentially from top to bottom are arranged from high to low. That is, the clock quality level of a clock source carrying QL-PRC SSM information is higher than that of a clock source carrying QL-SSU-A SSM information. If there are multiple selectable clock sources in a network element, the clock source with a higher quality level will be selected preferentially for tracking.

FIG. 1A shows a schematic diagram of implementing clock synchronization by a network element which does not adopt a reverse sending DNU function in the prior art. In the figure, an active clock and a standby clock of network elements NE1 and NE2 respectively come from two clock signals labeled ① and ②. Let two clock signals be signals generated by clock sources of QL-PRC level, and let NE2 do not adopt the reverse sending DNU function, then under normal circumstances, the clock signal labeled ① is tracked for both timing of NE1 and NE2. Now if the clock quality of the clock signal labeled ① which is received by NE1 is declined (such as declined to QL-SSU-A level), NE1 will automatically select the clock signal labeled ② which comes from NE2 as the clock source according to the priority (QL-PRC>QL-SSU-A), but in fact, NE2 has always been tracking the clock signal labeled ① which comes from NE1 as the clock source, obviously, a clock tracking loop is generated.

FIG. 1B shows a schematic diagram of implementing clock synchronization by a network element which adopts a reverse sending DNU function in the prior art. What is different from FIG. 1A is that, NE2 adopts the reverse sending DNU function, that is, when NE2 tracks the clock signal labeled ① which comes from NE1 as the clock source, the clock quality level of the clock signal labeled ② which comes from NE2 and is received by NE1 will be QL-DNU rather than QL-PRC. Now if the clock quality of the clock signal labeled ① which is received by NE1 is declined (such as declined to QL-SSU-A level), NE1 will still select the clock signal labeled ① as the clock source according to the priority (QL-SSU-A>QL-DNU), meanwhile the clock quality level of the clock signal labeled ①, which is sent to NE2 by NE1, will become QL-SSU-A from QL-PRC; then NE2 finds that the clock quality of the clock signal labeled ① which comes from NE1 is declined, and thus switches to the clock signal labeled ② according to the priority (QL-PRC>QL-SSU-A), and meanwhile the clock quality level of the clock signal labeled ②, which is sent to NE1 by NE2, will also become QL-PRC from QL-DNU, at this time NE1 automatically selects the clock signal labeled ② which comes from NE2 as the clock source according to the priority (QL-PRC>QL-SSU-A). In this process, no clock tracking loop will be generated.

However, the above method can be used for avoiding a clock tracking loop only in environments such as the environment that only one bidirectional clock tracking link exists between two network elements, which is shown in FIG. 1; when there are two or more bidirectional clock tracking links between two network elements, the above method cannot effectively avoid the generation of the clock tracking loop.

SUMMARY

In order to solve the problem in the prior art that the generation of a clock tracking loop cannot be effectively avoided, embodiments of the present invention provide a method, a system and a device for synchronizing clocks.

A first aspect provides a method for synchronizing clocks, including:

receiving at least two clock signals, where the at least two clock signals include a standby clock signal, and each of the clock signals is sent by a bidirectional clock tracking link respectively corresponding thereto;

setting two or more clock signals, coming from a same network element, in the at least two clock signals into a same clock source group;

selecting one clock signal from the at least two clock signals as a currently tracked clock signal; and if the currently tracked clock signal belongs to the clock source group, respectively sending a standby clock signal carrying quality level do not use information QL_DNU by using the bidirectional clock tracking link respectively corresponding to each of the clock signals in the clock source group to which the currently tracked clock signal belongs.

In a first possible implementation of the first aspect, the selecting one clock signal from the at least two clock signals as the currently tracked clock signal includes:

selecting one clock signal from the at least two clock signals as the currently tracked clock signal according to a clock priority and/or clock quality level information corresponding to each of the clock signals.

In a second possible implementation by combining the first aspect or the first possible implementation of the first aspect, the method further includes:

if the currently tracked clock signal belongs to the clock source group, and the currently tracked clock signal is lost or a clock quality level thereof is declined, re-selecting another clock signal in the clock source group as the currently tracked clock signal according to the clock priority and/or clock quality level information corresponding to each of the clock signals.

In a third possible implementation by combining the first aspect, the first possible implementation of the first aspect or the second possible implementation of the first aspect, the method further includes:

if the currently tracked clock signal belongs to the clock source group, and clock switching protection occurs since clock quality level information of all the clock signals in the clock source group to which the currently tracked clock signal belongs is lower than the clock quality level information of the standby clock signal, respectively sending the standby clock signal carrying switched clock quality level information by using the bidirectional clock tracking link respectively corresponding to each of the clock signals in the clock source group to which the currently tracked clock signal belongs.

A second aspect provides a network element, including:

a signal receiving module, configured to receive at least two clock signals, where the at least two clock signals include a standby clock signal, and each of the clock signals is sent by a bidirectional clock tracking link respectively corresponding thereto;

a source group setting module, configured to set two or more clock signals, coming from a same network element, in the at least two clock signals into a same clock source group;

a signal selecting module, configured to select one clock signal from the at least two clock signals as a currently tracked clock signal; and a signal feedback module, configured to, if the currently tracked clock signal belongs to the clock source group, respectively send the standby clock signal carrying quality level do not use information QL_DNU by using the bidirectional clock tracking link respectively corresponding to each of the clock signals in the clock source group to which the currently tracked clock signal belongs.

In a first possible implementation of the second aspect, the signal selecting module is specifically configured to select one clock signal from the at least two clock signals as the currently tracked clock signal according to a clock priority and/or clock quality level information corresponding to each of the clock signals.

In a second possible implementation by combining the second aspect or the first possible implementation of the second aspect, the network element further includes:

a tracking switching module;

the tracking switching module is configured to, if the currently tracked clock signal belongs to the clock source group, and the currently tracked clock signal is lost or a clock quality level thereof is declined, re-select another clock signal in the clock source group as the currently tracked clock signal according to the clock priority and/or clock quality level information corresponding to each of the clock signals.

In a third possible implementation by combining the second aspect, the first possible implementation of the second aspect or the second possible implementation of the second aspect, the network element further includes:

a switching protection module;

the switching protection module is configured to, if the currently tracked clock signal belongs to the clock source group, and clock switching protection occurs since clock quality level information of all the clock signals in the clock source group to which the currently tracked clock signal belongs is lower than the clock quality level information of the standby clock signal, respectively send the standby clock signal carrying switched clock quality level information by using the bidirectional clock tracking link respectively corresponding to each of the clock signals in the clock source group to which the currently tracked clock signal belongs.

A third aspect provides a network element, including:

a receiver, configured to receive at least two clock signals, where the at least two clock signals include a standby clock signal, and each of the clock signals is sent by a bidirectional clock tracking link respectively corresponding thereto;

a processor, configured to set two or more clock signals, coming from a same network element, in the at least two clock signals into a same clock source group;

the processor is further configured to select one clock signal from the at least two clock signals as a currently tracked clock signal; and a transmitter, configured to, if the currently tracked clock signal belongs to the clock source group, respectively send the standby clock signal carrying quality level do not use information QL_DNU by using the bidirectional clock tracking link respectively corresponding to each of the clock signals in the clock source group to which the currently tracked clock signal belongs.

In a first possible implementation of the third aspect, the processor is specifically configured to select one clock signal from the at least two clock signals as the currently tracked clock signal according to a clock priority and/or clock quality level information corresponding to each of the clock signals.

In a second possible implementation by combining the third aspect or the first possible implementation of the third aspect, the processor is further configured to, if the currently tracked clock signal belongs to the clock source group, and the currently tracked clock signal is lost or a clock quality level thereof is declined, re-select another clock signal in the clock source group as the currently tracked clock signal according to the clock priority and/or clock quality level information corresponding to each of the clock signals.

In a third possible implementation by combining the third aspect, the first possible implementation of the third aspect or the second possible implementation of the third aspect, the transmitter is further configured to, if the currently tracked clock signal belongs to the clock source group, and clock switching protection occurs since clock quality level information of all the clock signals in the clock source group to which the currently tracked clock signal belongs is lower than the clock quality level information of the standby clock signal, respectively send the standby clock signal carrying switched clock quality level information by using the bidirectional clock tracking link respectively corresponding to each of the clock signals in the clock source group to which the currently tracked clock signal belongs.

A fourth aspect provides a system for synchronizing clocks, including at least one network element as described in the second aspect, various possible implementations of the second aspect, the third aspect or various possible implementations of the third aspect.

By setting two or more clock signals coming from the same network element into the clock source group, and when tracking one clock signal in the clock source group, respectively sending the standby clock signal carrying quality level do not use information QL_DNU back to the bidirectional clock tracking link corresponding to each of the clock signals in the clock source group, the problem in the prior art that the generation of a clock tracking loop cannot be avoided in the scenario where there are two or more bidirectional clock tracking links between two network elements is solved; and the effect that in the scenario where there are two or more bidirectional clock tracking links between two network elements, the clock tracking loop will not be generated even if a certain bidirectional clock tracking link fails or the clock quality level of the clock signal therein is declined is achieved.

BRIEF DESCRIPTION OF DRAWINGS

To describe technical solutions in embodiments of the present invention more clearly, the following briefly describes the accompanying drawings required in the description of embodiments; apparently, the accompanying drawings illustrate only some exemplary embodiments of the present invention, and persons skilled in the art can derive other drawings from these drawings without creative efforts.

DESCRIPTION OF EMBODIMENTS

In order to make the objects, technical solutions and advantages of the present invention clearer, embodiments of the present invention are described further in detail with reference to the accompanying drawings.

The scenario where there are two or more bidirectional clock tracking links between two network elements is common in an LAG (Link Aggregation Group, link aggregation group) which is based on an LACP (Link Aggregation Control Protocol, link aggregation control protocol) of IEEE (Institute of Electrical and Electronics Engineers, American institute of electrical and electronics engineers) standard. As commonly stated, the LAG is to bind a plurality of ports with the same property, of two Ethernet switches, so that the original plurality of links between the two Ethernet switches can be used like being combined into one link. Of course, the situation that there are two or more bidirectional clock tracking links between two network elements is not limited to the Ethernet LAG environment, and may also exist in some scenarios in microwave air interface 1+1 (SD/FD/HSB), microwave air interface LAG, SDH (Synchronous Digital Hierarchy, synchronous digital hierarchy) and etc. To simplify the description, only the Ethernet LAG is exemplified herein.

Figure 2:
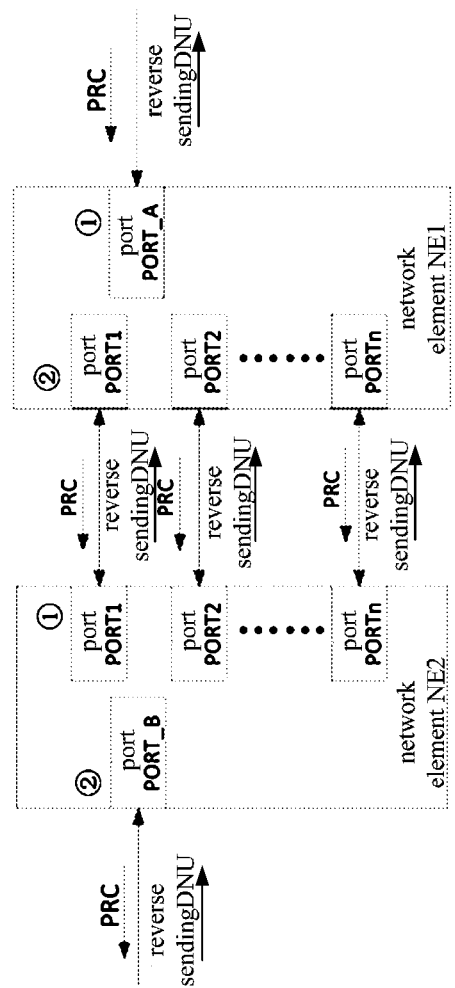
FIG. 2 is a schematic structural diagram of an implementing environment involved in an embodiment of the present invention.

Please refer to FIG. 2, which shows a schematic structural diagram of an implementing environment involved in an embodiment of the present invention. The implementing environment includes two network elements NE1 and NE2.

NE1 includes a total of n+1 LAG ports: PORT_A, PORT_1, PORT_2, . . . , PORT_n;

NE2 includes a total of n+1 LAG ports: PORT_B, PORT_1, PORT_2, . . . , PORT_n.

There is one bidirectional clock tracking link respectively between PORT_1, PORT_2, . . . , PORT_n of NE1 and corresponding PORT_1, PORT_2, . . . , PORT_n of NE2, and these n paratactic links form a link aggregation group, where n is a natural number.

Assuming that an active clock signal carrying QL-PRC SSM information is transmitted from NE1, and a standby clock signal carrying QL-DNU SSM information is transmitted from NE2, then:

NE1 can receive the active clock signal sent by a previous network element from the bidirectional clock tracking link corresponding to PORT_A, take the active clock signal as a currently tracked clock signal, and transmit the active clock signal to NE2 through n bidirectional clock tracking links corresponding to PORT_1, PORT_2, . . . , PORT_n; NE2 receives the active clock signal through n bidirectional clock tracking links corresponding to PORT_1, PORT_2, . . . , PORT_n, select one from the n bidirectional clock tracking links as a currently tracked clock signal according to a pre-configured priority, and send the active clock signal to the next network element through the bidirectional clock tracking link corresponding to PORT_B.

In addition, NE2 can receive the standby clock signal sent by the next network element from the bidirectional clock tracking link corresponding to PORT_B, and transmit the standby clock signal to NE1 through n bidirectional clock tracking links corresponding to PORT_1, PORT_2, . . . , PORT_n; NE1 receives the standby clock signal through n bidirectional clock tracking links corresponding to PORT_1, PORT_2, . . . , PORT_n, and sends the standby clock signal to the previous network element through the bidirectional clock tracking link corresponding to PORT_A.

The above process is mainly achieved through a clock priority list in NE1 and NE2. Specifically, in the clock priority list of NE1, PORT_A is set to have the highest priority, while PORT_1, PORT_2, . . . , PORT_n are set to have lower priorities; in the clock priority list of NE2, one of PORT_1, PORT_2, . . . , PORT_n is set to have the highest priority, while other LAG ports are set to have lower priorities, for example, PORT_1 is set to have the highest priority, PORT_2 is set to have a second-highest priority, and other LAG ports are set to have lower priorities.

Obviously, according to the method for synchronizing clocks in the prior art, if a certain link of the n bidirectional clock tracking links corresponding to PORT_1, PORT_2, . . . , PORT_n fails, which causes that NE2 cannot receive the active clock signal transmitted by this link, then NE2 may conduct clock switching protection on this link, thereby forming a clock tracking loop with other links of the n bidirectional clock tracking links.

Figure 1A:
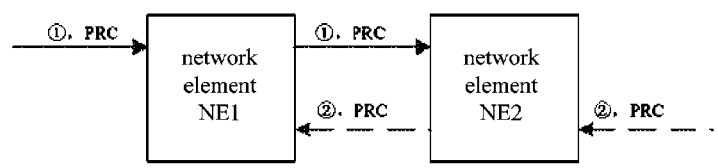
FIG. 1A and FIG. 1B respectively show a schematic diagram of implementing clock synchronization by a network element which does not adopt a reverse sending DNU function and adopts the reverse sending DNU function in the prior art.
Figure 1B:
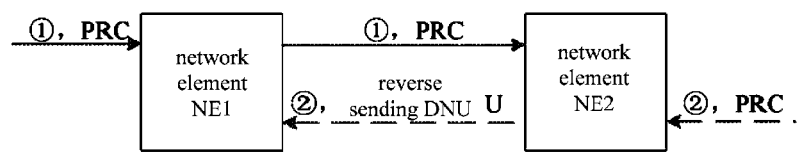
Figure 3:
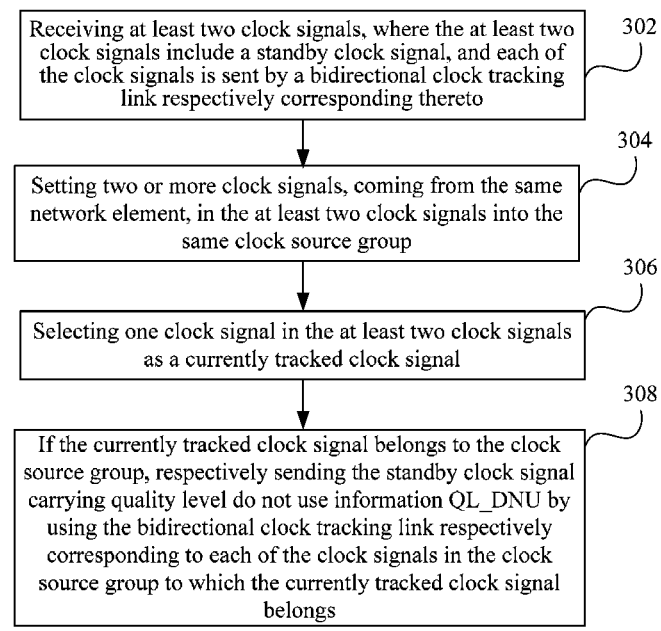
FIG. 3 is a flowchart of a method for synchronizing clocks according to an embodiment of the present invention.

Please refer to FIG. 3, which shows a flowchart of a method for synchronizing clocks according to an embodiment of the present invention. This embodiment is described by taking the method for synchronizing clocks applied in NE2 shown in FIG. 2 as an example, the method for synchronizing clocks includes:

S302, Receiving at least two clock signals, where the at least two clock signals include a standby clock signal, and each of the clock signals is sent by a bidirectional clock tracking link respectively corresponding thereto;

Taking FIG. 1 as an example, NE2 receives n+1 clock signals, each of the clock signals is sent by a corresponding bidirectional clock tracking link, where n clock signals are active clock signals coming from NE1, and the other one clock signal is a standby clock signal coming from the next network element.

S304, Setting two or more clock signals, coming from the same network element, in the at least two clock signals into a same clock source group;

NE2 sets two or more clock signals, coming from the same network element, in the received n+1 clock signals into a same clock source group, that is, NE2 may set the received n active clock signals coming from NE1 into a same clock source group.

It should be noted that, the "coming from the same network element" not only refers to the clock signal directly coming from the network element, but also includes the clock signal which is forwarded by other network element and indirectly comes from the network element.

S306, Selecting one clock signal from the at least two clock signals as a currently tracked clock signal;

NE2 selects one clock signal in the received n+1 clock signals as the currently tracked clock signal. Specifically, NE2 may select one clock signal in at least two clock signals as the currently tracked clock signal according to a clock priority and/or clock quality level information corresponding to each of the clock signals. Generally, the clock signal having the highest clock quality level information is preferentially selected as the currently tracked clock signal according to the clock quality level information corresponding to each of the clock signals; if there are two or more clock signals having the highest clock quality level information, the clock signal having the highest clock priority is selected as the currently tracked clock signal. Taking FIG. 1 as an example, NE2 receives n active clock signals which come from NE1 and carry QL-PRC SSM information, and one standby clock signal which comes from the next network element and carries QL-DNU SSM information; since the clock quality level corresponding to the QL-PRC SSM information is higher than the clock quality level corresponding to the QL-DNU SSM information, NE2 preferentially selects one clock signal of the n active clock signals coming from NE1 as the currently tracked clock signal. In the case that the clock quality levels of the n active clock signals coming from NE1 are the same, NE2 may select, according to a built-in clock priority list, the active clock signal transmitted in the bidirectional clock tracking link corresponding to the LAG port having the highest priority in PORT_1, PORT_2, . . . , PORT_n as the currently tracked clock signal, for example, the clock priority of PORT_1 is the highest, then NE2 selects the active clock signal transmitted in the bidirectional clock tracking link corresponding to PORT_1 as the currently tracked clock signal.

S308, If the currently tracked clock signal belongs to the clock source group, respectively sending the standby clock signal carrying quality level do not use information QL_DNU by using the bidirectional clock tracking link respectively corresponding to each of the clock signals in the clock source group to which the currently tracked clock signal belongs.

NE2 tracks one clock signal in the clock source group coming from NE1, so NE2 respectively sends the standby clock signal carrying quality level do not use information QL_DNU back to NE1 by using the bidirectional clock tracking link respectively corresponding to each of the clock signals in the clock source group coming from NE1. That is, NE2 respectively sends the standby clock signal carrying quality level do not use information QL_DNU back to each link of the n bidirectional clock tracking links corresponding to PORT_1, PORT_2, . . . , PORT_n.

At this time, even if a certain link of the n bidirectional clock tracking links corresponding to PORT_1, PORT_2, . . . , PORT_n fails, the clock tracking loop will not be generated.

To sum up, in the method for synchronizing clocks provided by this embodiment, by setting two or more clock signals coming from the same network element into the clock source group, and when tracking one clock signal in the clock source group, respectively sending the standby clock signal carrying quality level do not use information QL_DNU back to the bidirectional clock tracking link corresponding to each of the clock signals in the clock source group, the problem in the prior art that the generation of the clock tracking loop cannot be avoided in the scenario where there are two or more bidirectional clock tracking links between two network elements is solved; and the effect that in the scenario where there are two or more bidirectional clock tracking links between two network elements, the clock tracking loop will not be generated even if a certain bidirectional clock tracking link fails or the clock quality level of the clock signal therein is declined is achieved.

Figure 4:
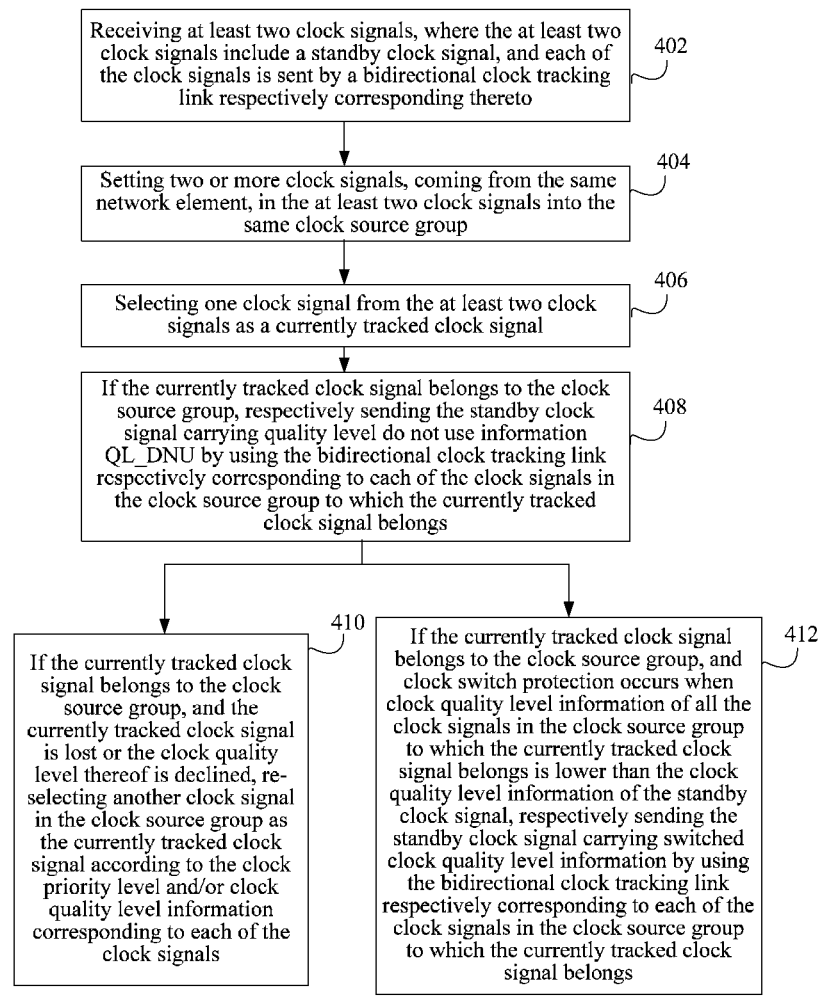
FIG. 4 is a flowchart of a method for synchronizing clocks according to another embodiment of the present invention.

Please refer to FIG. 4, which shows a flowchart of a method for synchronizing clocks according to another embodiment of the present invention. This embodiment is still described by taking the method for synchronizing clocks applied in NE2 shown in FIG. 2 as an example. What is different from the previous embodiment is that, this embodiment further includes S410 and S412. The method for synchronizing clocks includes:

S402, Receiving at least two clock signals, where the at least two clock signals include a standby clock signal, and each of the clock signals is sent by a bidirectional clock tracking link respectively corresponding thereto;

NE2 receives n+1 clock signals, each of the clock signals is sent by a corresponding bidirectional clock tracking link, where n clock signals are active clock signals coming from NE1, and the other one clock signal is a standby clock signal coming from the next network element.

S404, Setting two or more clock signals, coming from the same network element, in the at least two clock signals into the same clock source group;

NE2 sets clock signals, coming from the same network element, in the received n+1 clock signals into the same clock source group, that is, NE2 can set the received n active clock signals coming from NE1 into the same clock source group.

It should be noted that, the "coming from the same network element" not only refers to the clock signal directly coming from the network element, but also includes the clock signal which is forwarded by other network element and indirectly comes from the network element.

S406, Selecting one clock signal from the at least two clock signals as a currently tracked clock signal;

NE2 selects one clock signal in the received n+1 clock signals as the currently tracked clock signal. Specifically, NE2 can select one clock signal from at least two clock signals as the currently tracked clock signal according to a clock priority and/or clock quality level information corresponding to each of the clock signals. Generally, the clock signal having the highest clock quality level information is preferentially selected as the currently tracked clock signal according to the clock quality level information corresponding to each of the clock signals; if there are two or more clock signals having the highest clock quality level information, the clock signal having the highest clock priority is selected as the currently tracked clock signal. Taking FIG. 1 as an example, NE2 receives n active clock signals which come from NE1 and carry QL-PRC SSM information, and one standby clock signal which comes from the next network element and carries QL-DNU SSM information; since the clock quality level corresponding to the QL-PRC SSM information is higher than the clock quality level corresponding to the QL-DNU SSM information, NE2 preferentially selects one clock signal from the n active clock signals coming from NE1 as the currently tracked clock signal. In the case that the clock quality levels of the n active clock signals coming from NE1 are the same, NE2 can select, according to a built-in clock priority list, the active clock signal transmitted in the bidirectional clock tracking link corresponding to the LAG port having the highest priority in PORT_1, PORT_2, . . . , PORT_n as the currently tracked clock signal, for example, the clock priority of PORT_1 is the highest, then NE2 selects the active clock signal transmitted in the bidirectional clock tracking link corresponding to PORT_1 as the currently tracked clock signal.

S408, If the currently tracked clock signal belongs to the clock source group, respectively sending the standby clock signal carrying quality level do not use information QL_DNU by using the bidirectional clock tracking link respectively corresponding to each of the clock signals in the clock source group to which the currently tracked clock signal belongs.

NE2 tracks one clock signal in the clock source group coming from NE1, so NE2 respectively sends the standby clock signal carrying quality level do not use information QL_DNU back to NE1 by using the bidirectional clock tracking link respectively corresponding to each of the clock signals in the clock source group coming from NE1. That is, NE2 respectively sends the standby clock signal carrying quality level do not use information QL_DNU back to each link of the n bidirectional clock tracking links corresponding to PORT_1, PORT_2, . . . , PORT_n.

S410, If the currently tracked clock signal belongs to the clock source group, and the currently tracked clock signal is lost or the clock quality level thereof is declined, re-selecting another clock signal in the clock source group as the currently tracked clock signal according to the clock priority and/or clock quality level information corresponding to each of the clock signals;

NE2 tracks one clock signal in the clock source group coming from NE1, if the clock signal currently tracked by NE2 is lost, then NE2 re-selects another clock signal in the clock source group as the currently tracked clock signal according to the clock priority and/or clock quality level information corresponding to each of the clock signals. For example, the clock signal which is transmitted in the bidirectional clock tracking link corresponding to PORT_1 and is currently tracked by NE2 is lost, NE2 can select, according to the built-in priority list, the clock signal transmitted in the bidirectional clock tracking link corresponding to PORT_2 of which the priority is lower than PORT_1 but higher than other LAG ports as the currently tracked signal.

S412, If the currently tracked clock signal belongs to the clock source group, and clock switching protection occurs when clock quality level information of all the clock signals in the clock source group to which the currently tracked clock signal belongs is lower than the clock quality level information of the standby clock signal, respectively sending the standby clock signal carrying switched clock quality level information by using the bidirectional clock tracking link respectively corresponding to each of the clock signals in the clock source group to which the currently tracked clock signal belongs.

Figure 5:
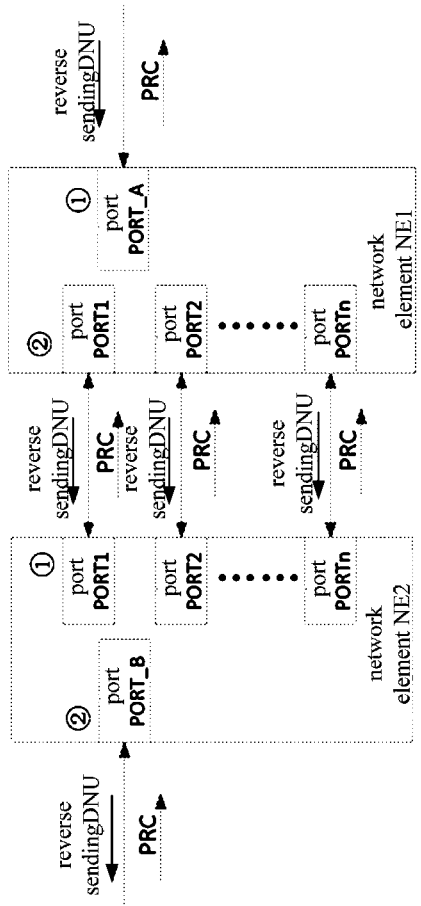
FIG. 5 is a schematic diagram of implementing a method for synchronizing clocks according to another embodiment of the present invention.

Assuming that the clock quality level of the active clock signal received by NE1 is declined from QL_PRC to QL_SSU_A, and after the next network element conducts switching protection, the clock quality level of the standby clock signal sent to NE2 is changed from QL_DNU to QL_PRC, NE2 will also conduct clock switching protection. At this time, NE2 sends the standby clock signal carrying QL PRC SSM information back to each link of the n bidirectional clock tracking links corresponding to PORT_1, PORT_2, . . . , PORT_n, as shown in FIG. 5.

Thereafter, NE1 selects one standby clock signal in the n bidirectional clock tracking links corresponding to PORT_1, PORT_2, . . . , PORT_n as the currently tracked clock signal according to the priority, and sends the standby clock signal carrying QL_DNU SSM information back to NE2.

To sum up, in the method for synchronizing clocks provided by this embodiment, by setting two or more clock signals coming from the same network element into the clock source group, and when tracking one clock signal in the clock source group, respectively sending the standby clock signal carrying quality level do not use information QL_DNU back to the bidirectional clock tracking link corresponding to each of the clock signals in the clock source group, the problem in the prior art that the generation of the clock tracking loop cannot be avoided in the scenario where there are two or more bidirectional clock tracking links between two network elements is solved; and the effect that in the scenario where there are two or more bidirectional clock tracking links between two network elements, the clock tracking loop will not be generated even if a certain bidirectional clock tracking link fails or the clock quality level of the clock signal therein is declined is achieved. Furthermore, by still respectively sending the standby clock signal carrying the same clock quality level back to the bidirectional clock tracking link corresponding to each of the clock signals in the clock source group during the clock switching protection, the effect that in the scenario where there are two or more bidirectional clock tracking links between two network elements, the clock tracking loop will not be generated either even if the clock protection switching is needed is further achieved.

The above embodiments are described only by taking two network elements NE1 and NE2 existing in the implementing environment as an example, where NE2 of the two network elements is described primarily. In order to better describe the implementation where a plurality of network elements exist, please refer to the following embodiments described by taking three network elements existing in the implementing environment as an example.

Figure 6:
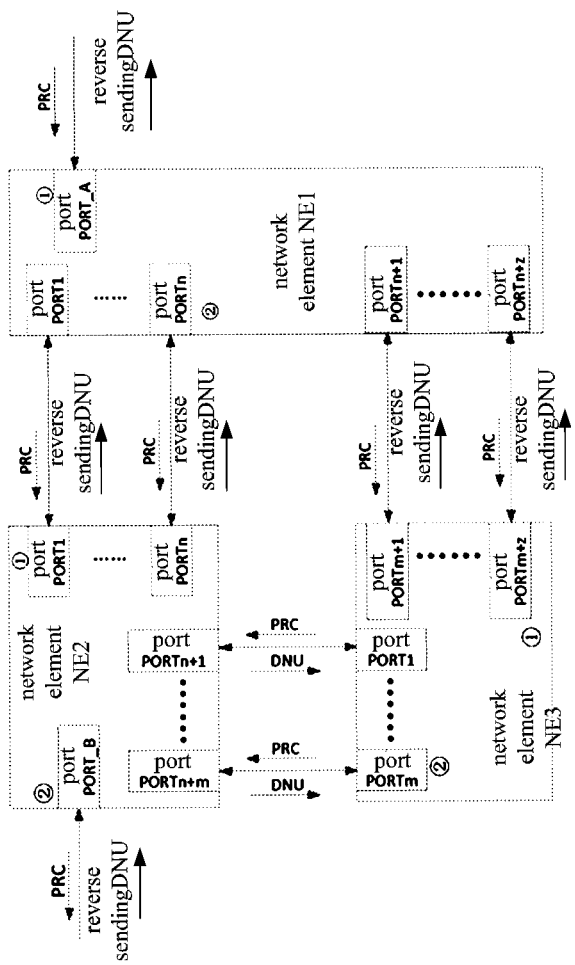
FIG. 6 is a schematic structural diagram of an implementing environment involved in still another embodiment of the present invention.

Please refer to FIG. 6, which shows a schematic structural diagram of an implementing environment involved in another embodiment of the present invention. The implementing environment includes three network elements NE1, NE2 and NE3.

NE1 includes a total of n+z+1 LAG ports: PORT_A, PORT_1, . . . , PORT_n+z;

NE2 includes a total of n+m+1 LAG ports: PORT_B, PORT_1, . . . , PORT_n+m;

NE3 includes a total of m+z LAG ports: PORT_1, . . . , PORT_m+z.

There is one bidirectional clock tracking link respectively between PORT_1, PORT_2, . . . , PORT_n of NE1 and corresponding PORT_1, PORT_2, . . . , PORT_n of NE2, and these n paratactic links form a link aggregation group.

There is one bidirectional clock tracking link respectively between PORT_n+1, PORT_n+z of NE1 and corresponding PORT_m+1, . . . , PORT_m+z of NE3, and these z paratactic links form a link aggregation group.

There is one bidirectional clock tracking link respectively between PORT_n+1, . . . , PORT_n+m of NE2 and corresponding PORT_1, . . . , PORT_m of NE3, and these m paratactic links form a link aggregation group.

Assuming that an active clock signal carrying QL-PRC SSM information is transmitted from the right side, and a standby clock signal carrying QL-DNU SSM information is transmitted from the left side, then:

NE1 may receive the active clock signal sent by a previous network element from the bidirectional clock tracking link corresponding to PORT_A, meanwhile take the active clock signal as a currently tracked clock signal, and transmit the active clock signal to NE2 through n bidirectional clock tracking links corresponding to PORT_1, . . . , PORT_n, transmit the active clock signal to NE3 through z bidirectional clock tracking links corresponding to PORT_n+1, . . . , PORT_n+z.

NE3 receives the active clock signal through z bidirectional clock tracking links corresponding to PORT_m+1, . . . , PORT_m+z, select one from the z bidirectional clock tracking links as a currently tracked clock signal according to a pre-configured priority, and send the active clock signal to NE2 through the bidirectional clock tracking links corresponding to PORT_1, . . . , PORT_m.

NE2 receives the active clock signal directly coming from NE1 through n bidirectional clock tracking links corresponding to PORT_1, . . . , PORT_n, and receives from NE3 the active clock signal indirectly coming from NE1 through m bidirectional clock tracking links corresponding to PORT_n+1, . . . , PORT_n+m, and then selects one from the n+m bidirectional clock tracking links as a currently tracked clock signal according to a pre-configured priority, and sends the active clock signal to the next network element through the bidirectional clock tracking link corresponding to PORT_B.

In addition, NE2 can receive the standby clock signal sent by the next network element from the bidirectional clock tracking link corresponding to PORT_B, and transmit the standby clock signal to NE1 through n bidirectional clock tracking links corresponding to PORT_1, . . . , PORT_n; NE1 receives the standby clock signal through n bidirectional clock tracking links corresponding to PORT_1, . . . , PORT_n, and sends the standby clock signal to the previous network element through the bidirectional clock tracking link corresponding to PORT_A.

NE2 also transmits the standby clock signal to NE3 through m bidirectional clock tracking links corresponding to PORT_n+1, . . . , PORT_n+m; NE3 receives the standby clock signal through m bidirectional clock tracking links corresponding to PORT_1, . . . , PORT_m, and sends the standby clock signal to NE1 through the bidirectional clock tracking links corresponding to PORT_m+1, . . . , PORT_m+z.

Figure 7:
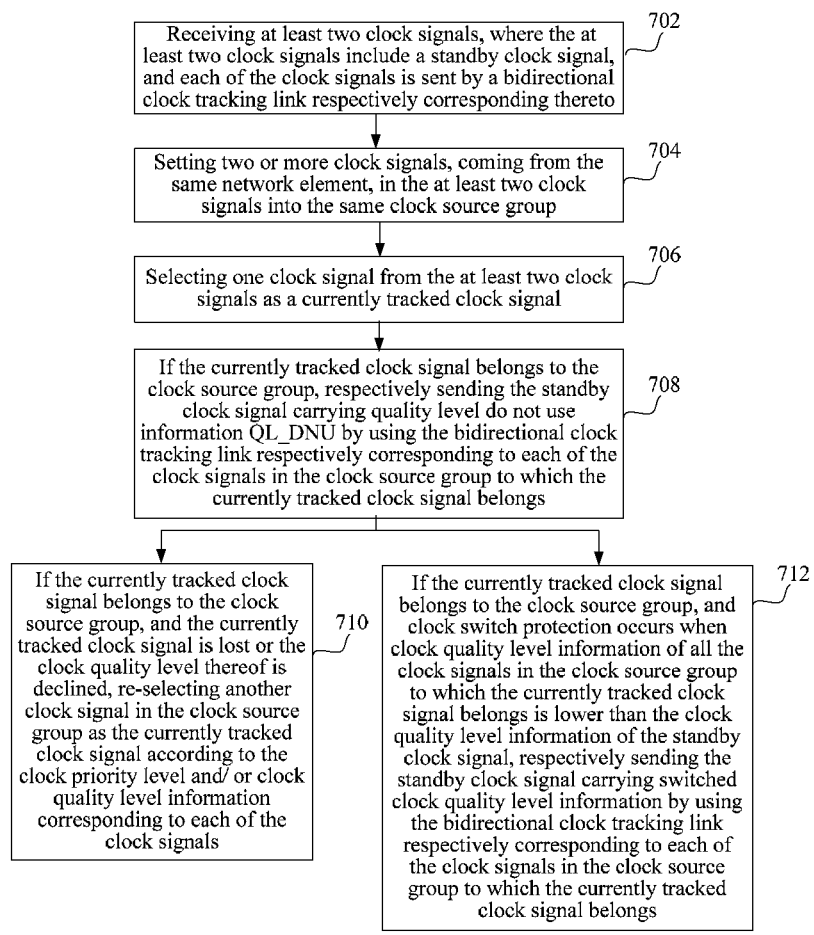
FIG. 7 is a flowchart of a method for synchronizing clocks according to still another embodiment of the present invention.
Figure 8:
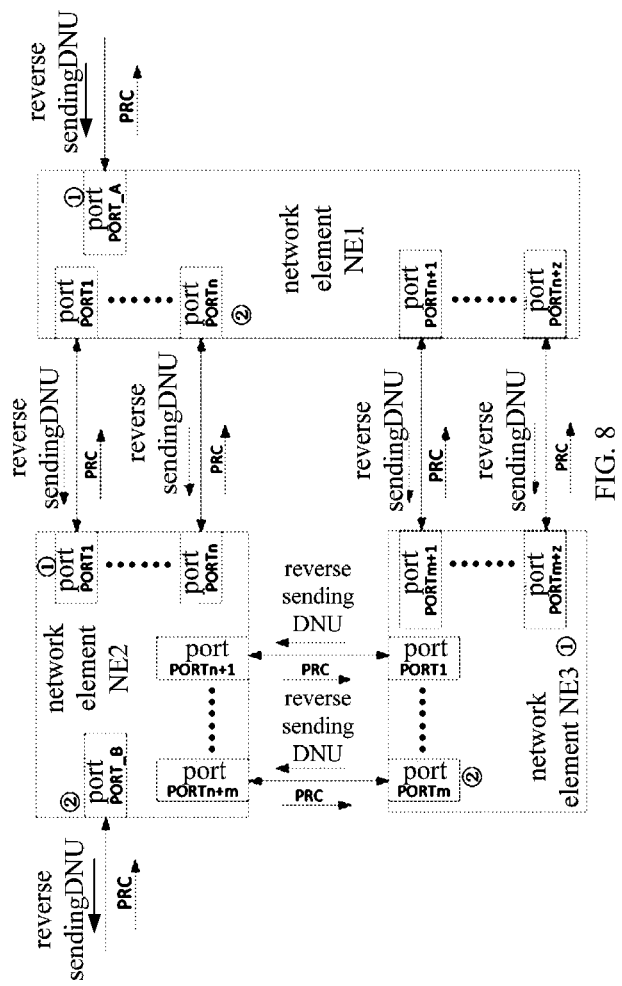
FIG. 8 is a schematic diagram of implementing a method for synchronizing clocks according to still another embodiment of the present invention.

Please refer to FIG. 7, which shows a flowchart of a method for synchronizing clocks according to another embodiment of the present invention. This embodiment is described by taking the method for synchronizing clocks applied in NE1, NE2 and NE3 shown in FIG. 6 as an example, the method for synchronizing clocks includes:

S702, Receiving at least two clock signals, where the at least two clock signals include a standby clock signal, and each of the clock signals is sent by a bidirectional clock tracking link respectively corresponding thereto;

NE1 receives n+z+1 clock signals, each of the clock signals is sent by a corresponding bidirectional clock tracking link, where one clock signal is an active clock signal coming from a previous network element, other n clock signals are standby clock signals coming from NE2, and z clock signals are standby clock signals coming from NE3.

NE2 receives n+m+1 clock signals, each of the clock signals is sent by a corresponding bidirectional clock tracking link, where n clock signals are active clock signals coming from NE1, other m clock signals are active clock signals coming from NE3, and one clock signal is a standby clock signal coming from the next network element.

NE3 receives z+m clock signals, each of the clock signals is sent by a corresponding bidirectional clock tracking link, where z clock signals are active clock signals coming from NE1, and m clock signals are standby clock signals coming from NE2.

S704, Setting two or more clock signals, coming from the same network element, in the at least two clock signals into the same clock source group;

In terms of NE1, there are n standby clock signals coming from NE2 and z standby clock signals coming from NE3. But in essence, the z standby clock signals coming from NE3 are standby clock signals indirectly coming from NE2, so NE1 can uniformly set the n+z clock signals into the first clock source group.

In terms of NE2, there are n active clock signals coming from NE1 and m active clock signals coming from NE3. But in essence, the m active clock signals coming from NE3 are active clock signals indirectly coming from NE1, so NE2 can set the n+m clock signals into the second clock source group.

In terms of NE3, there are z active clock signals coming from NE1 and m standby clock signals coming from NE2, so NE3 can set the z clock signals coming from NE1 into the third clock source group, and set the m clock signals coming from NE2 into the fourth clock source group.

S706, Selecting one clock signal from the at least two clock signals as a currently tracked clock signal;

Each network element selects one clock signal from the at least two clock signals as a currently tracked clock signal according to a clock priority and/or clock quality level information corresponding to each of the clock signals. Generally, the clock signal having the highest clock quality level information is preferentially selected as the currently tracked clock signal according to the clock quality level information corresponding to each of the clock signals; if there are two or more clock signals having the highest clock quality level information, the clock signal having the highest clock priority is selected as the currently tracked clock signal.

In terms of NE1, in the received n+z+1 clock signals, the clock quality level of the active clock signal coming from the previous network element is the highest, so NE1 selects the active clock signal transmitted by the bidirectional clock tracking link corresponding to PORT_A as the currently tracked clock signal.

In terms of NE2, since the clock quality levels of the received n clock signals coming from NE1 and m clock signals coming from NE3 are higher than that of the one standby clock signal coming from the next network element, NE2 should select one clock signal from the n+m clock signals coming from NE1 and NE3 as the currently tracked clock signal. In the case that the clock quality levels of the n+m clock signals coming from NE1 and NE3 are the same, NE2 can select, according to a built-in clock priority list, the active clock signal transmitted in the bidirectional clock tracking link corresponding to the LAG port having the highest priority in PORT_1, . . . , PORT_n+m as the currently tracked clock signal, for example, the clock priority of PORT_1 is the highest, then NE2 selects the active clock signal transmitted in the bidirectional clock tracking link corresponding to PORT_1 as the currently tracked clock signal.

In terms of NE3, since the clock quality level of the received z active clock signals coming from NE1 is higher than the clock quality level of the m standby clock signals coming from NE2, and the clock quality level of the active clock signal coming from the previous network element is the highest, NE3 should select one clock signal from the z clock signals coming from NE1 as the currently tracked clock signal. In the case that the clock quality levels of the z clock signals coming from NE1 are the same, NE3 can select, according to a built-in clock priority list, the active clock signal transmitted in the bidirectional clock tracking link corresponding to the LAG port having the highest priority in PORT_m+1, . . . , PORT_m+z as the currently tracked clock signal, for example, the clock priority of PORT_m+1 is the highest, then NE3 selects the active clock signal transmitted in the bidirectional clock tracking link corresponding to PORT_m+1 as the currently tracked clock signal.

S708, If the currently tracked clock signal belongs to the clock source group, respectively sending the standby clock signal carrying quality level do not use information QL_DNU by using the bidirectional clock tracking link respectively corresponding to each of the clock signals in the clock source group to which the currently tracked clock signal belongs.

In terms of NE1, the active clock signal transmitted in the bidirectional clock tracking link corresponding to PORT_A is tracked, and the standby clock signal carry quality level do not use information QL_DNU can be sent back to the previous network element according to the existing reverse sending DNU function.

In terms of NE2, one clock signal in the second clock source group is tracked, so NE2 respectively sends the standby clock signal carrying quality level do not use information QL_DNU back by using the bidirectional clock tracking link respectively corresponding to each of the clock signals in the second clock source group. That is, NE2 respectively sends the standby clock signal carrying quality level do not use information QL_DNU back to each link of the n+m bidirectional clock tracking links corresponding to PORT_1, . . . , PORT_n+m.

In terms of NE3, one clock signal in the fourth clock source group is tracked, so NE3 respectively sends the standby clock signal carrying quality level do not use information QL_DNU back to NE1 by using the bidirectional clock tracking link respectively corresponding to each of the clock signals in the fourth clock source group. That is, NE3 respectively sends the standby clock signal carrying quality level do not use information QL_DNU back to each link of the z bidirectional clock tracking links corresponding to PORT_m+1, . . . , PORT_m+z.

S710, If the currently tracked clock signal belongs to the clock source group, and the currently tracked clock signal is lost or the clock quality level thereof is declined, re-selecting another clock signal in the clock source group as the currently tracked clock signal according to the clock priority and/or clock quality level information corresponding to each of the clock signals;

Taking NE2 as an example, NE2 tracks one clock signal in the second clock source group, if the clock signal currently tracked by NE2 is lost, then NE2 re-selects another clock signal in the second clock source group as the currently tracked clock signal according to the clock priority and/or clock quality level information corresponding to each of the clock signals. For example, the clock signal which is transmitted in the bidirectional clock tracking link corresponding to PORT_1 and is currently tracked by NE2 is lost, NE2 can select, according to the built-in priority list, the clock signal transmitted in the bidirectional clock tracking link corresponding to PORT_2 of which the priority is lower than PORT_1 but higher than other LAG ports as the currently tracked signal.

S712, If the currently tracked clock signal belongs to the clock source group, and clock switching protection occurs when clock quality level information of all the clock signals in the clock source group to which the currently tracked clock signal belongs is lower than the clock quality level information of the standby clock signal, respectively sending the standby clock signal carrying switched clock quality level information by using the bidirectional clock tracking link respectively corresponding to each of the clock signals in the clock source group to which the currently tracked clock signal belongs.

Assuming that the clock quality level of the active clock signal received by NE1 is declined from QL_PRC to QL_SSU_A, then the clock quality levels of all the active clock signals received by NE2 and NE3 will be declined from QL_PRC to QL_SSU_A; and the clock quality levels of all the active clock signals which are sent to NE2 by NE3 and sent to the next network element by NE2 will also be declined from QL_PRC to QL_SSU_A;

If the clock quality level of the standby clock signal sent to NE2 is changed from QL_DNU to QL_PRC after the next network element of NE2 conducts switching protection, in NE2, the clock quality levels of all the clock signals in the second clock source group coming from NE1 are lower than the clock quality level of the standby clock signal coming from the next network element, therefore NE2 will also conduct clock switching protection. At this time, NE2 sends the standby clock signal carrying QL_PRC SSM information back to each link of the n+m bidirectional clock tracking links corresponding to PORT_1, . . . , PORT_n+m belonging to the second clock source group.

After NE3 receives the standby clock signal carrying QL_PRC SSM information sent by NE2, in NE3, the clock quality levels of the fourth clock source group coming from NE1 are lower than the clock quality level of the third clock source group coming from NE2, then meanwhile NE3 conducts clock switching protection, and sends the standby clock signal carrying QL_PRC SSM information back to each link of the z bidirectional clock tracking links corresponding to PORT_m+1, . . . , PORT_m+z belonging to the fourth clock source group.

Then NE1 selects one standby clock signal in the first clock source group as the currently tracked clock signal according to the built-in clock priority list.

Obviously, the clock tracking loop will not be generated in each clock synchronization process described above.

To sum up, in the method for synchronizing clocks provided by this embodiment, by setting two or more clock signals coming from the same network element into the clock source group, and when tracking one clock signal in the clock source group, respectively sending the standby clock signal carrying quality level do not use information QL DNU back to the bidirectional clock tracking link corresponding to each of the clock signals in the clock source group, the problem in the prior art that the generation of the clock tracking loop cannot be avoided in the scenario where there are two or more bidirectional clock tracking links between two network elements is solved; and the effect that in the scenario where there are two or more bidirectional clock tracking links between two network elements, the clock tracking loop will not be generated even if a certain bidirectional clock tracking link fails or the clock quality level of the clock signal therein is declined is achieved. Furthermore, by still respectively sending the standby clock signal carrying the same clock quality level back to the bidirectional clock tracking link corresponding to each of the clock signals in the clock source group during the clock switching protection, the effect that in the scenario where there are two or more bidirectional clock tracking links between two network elements, the clock tracking loop will not be generated either even if the clock protection switching is needed is further achieved.

The following embodiments are apparatus embodiments of the present invention, which can be used for implementing the method embodiments of the present invention. For the technical details which are not described in the apparatus embodiments of the present invention, please refer to the method embodiments of the present invention.

Figure 9:
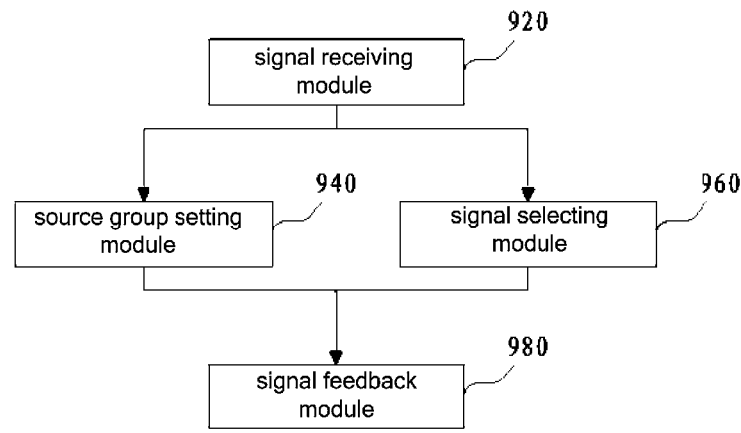
FIG. 9 is a structural block diagram of a network element according to an embodiment of the present invention.

Please refer to FIG. 9, which shows a structural block diagram of a network element according to an embodiment of the present invention. The network element includes a signal receiving module 920, a source group setting module 940, a signal selecting module 960 and a signal feedback module 980.

The signal receiving module 920 is configured to receive at least two clock signals, where the at least two clock signals include a standby clock signal, and each of the clock signals is sent by a bidirectional clock tracking link respectively corresponding thereto.

The source group setting module 940 is configured to set two or more clock signals, coming from the same network element, in the at least two clock signals received by the signal receiving module 920 into the same clock source group.

The signal selecting module 960 is configured to select one clock signal from the at least two clock signals received by the signal receiving module 920 as a currently tracked clock signal.

The signal feedback module 980 is configured to, if the clock signal currently tracked by the signal selecting module 960 belongs to the clock source group set by the source group setting module 940, respectively send the standby clock signal carrying quality level do not use information QL_DNU by using the bidirectional clock tracking link respectively corresponding to each of the clock signals in the clock source group to which the currently tracked clock signal belongs.

To sum up, in the network element provided by this embodiment, by setting two or more clock signals coming from the same network element into the clock source group, and when tracking one clock signal in the clock source group, respectively sending the standby clock signal carrying quality level do not use information QL_DNU back to the bidirectional clock tracking link corresponding to each of the clock signals in the clock source group, the problem in the prior art that the generation of a clock tracking loop cannot be avoided in the scenario where there are two or more bidirectional clock tracking links between two network elements is solved; and the effect that in the scenario where there are two or more bidirectional clock tracking links between two network elements, the clock tracking loop will not be generated even if a certain bidirectional clock tracking link fails or the clock quality level of the clock signal therein is declined is achieved.

Figure 10:
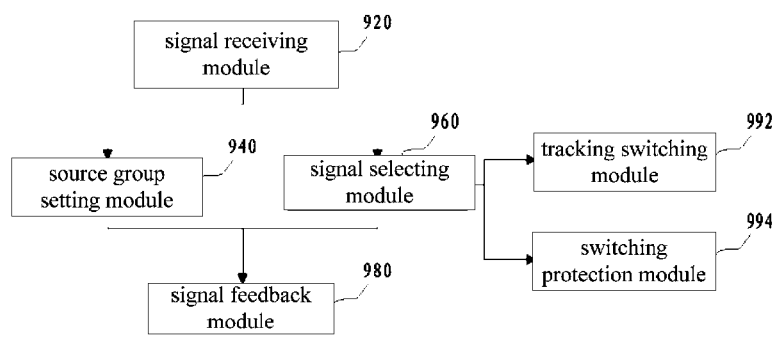
FIG. 10 is a structural block diagram of a network element according to another embodiment of the present invention.

Please refer to FIG. 10, which shows a structural block diagram of a network element according to another embodiment of the present invention. The network element includes a signal receiving module 920, a source group setting module 940, a signal selecting module 960, a signal feedback module 980, a tracking switching module 992 and a switching protection module 994.

The signal receiving module 920 is configured to receive at least two clock signals, where the at least two clock signals include a standby clock signal, and each of the clock signals is sent by a bidirectional clock tracking link respectively corresponding thereto.

The source group setting module 940 is configured to set two or more clock signals, coming from the same network element, in the at least two clock signals received by the signal receiving module 920 into the same clock source group.

The signal selecting module 960 is configured to select one clock signal from the at least two clock signals received by the signal receiving module 920 as a currently tracked clock signal. Specifically, the signal selecting module 960 is configured to select one clock signal from the at least two clock signals as the currently tracked clock signal according to clock a priority and/or clock quality level information corresponding to each of the clock signals.

The signal feedback module 980 is configured to, if the clock signal currently tracked by the signal selecting module 960 belongs to the clock source group set by the source group setting module 940, respectively send the standby clock signal carrying quality level do not use information QL_DNU by using the bidirectional clock tracking link respectively corresponding to each of the clock signals in the clock source group to which the currently tracked clock signal belongs.

The tracking switching module 992 is configured to, if the clock signal currently tracked by the signal selecting module 960 belongs to the clock source group, and the currently tracked clock signal is lost or the clock quality level thereof is declined, re-select another clock signal in the clock source group as the currently tracked clock signal according to the clock priority and/or clock quality level information corresponding to each of the clock signals.

The switching protection module 994 is configured to, if the clock signal currently tracked by the signal selecting module 960 belongs to the clock source group, and clock switching protection occurs when clock quality level information of all the clock signals in the clock source group to which the currently tracked clock signal belongs is lower than the clock quality level information of the standby clock signal, respectively send the standby clock signal carrying switched clock quality level information by using the bidirectional clock tracking link respectively corresponding to each of the clock signals in the clock source group to which the currently tracked clock signal belongs.

To sum up, in the network element provided by this embodiment, by setting two or more clock signals coming from the same network element into the clock source group, and when tracking one clock signal in the clock source group, respectively sending the standby clock signal carrying quality level do not use information QL_DNU back to the bidirectional clock tracking link corresponding to each of the clock signals in the clock source group, the problem in the prior art that the generation of a clock tracking loop cannot be avoided in the scenario where there are two or more bidirectional clock tracking links between two network elements is solved; and the effect that in the scenario where there are two or more bidirectional clock tracking links between two network elements, the clock tracking loop will not be generated even if a certain bidirectional clock tracking link fails or the clock quality level of the clock signal therein is declined is achieved. Furthermore, by still respectively sending the standby clock signal carrying the same clock quality level back to the bidirectional clock tracking link corresponding to each of the clock signals in the clock source group during the clock switching protection, the effect that in the scenario where there are two or more bidirectional clock tracking links between two network elements, the clock tracking loop will not be generated either even if the clock protection switching is needed is further achieved.

Figure 11:
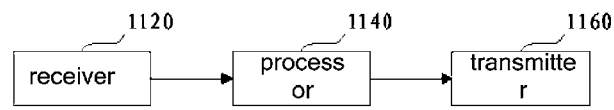
FIG. 11 is a structural block diagram of a network element according to still another embodiment of the present invention.

Please refer to FIG. 11, which shows a structural block diagram of a network element according to an embodiment of the present invention. The network element includes a receiver 1120, a processor 1140 and a transmitter 1160.

The receiver 1120 is configured to receive at least two clock signals, where the at least two clock signals include a standby clock signal, and each of the clock signals is sent by a bidirectional clock tracking link respectively corresponding thereto.

The processor 1140 is configured to set two or more clock signals, coming from the same network element, in the at least two clock signals received by the receiver 1120 into the same clock source group.

The processor 1140 is further configured to select one clock signal from the at least two clock signals received by the receiver 1120 as a currently tracked clock signal.

The transmitter 1160 is configured to, if the currently tracked clock signal belongs to the clock source group, respectively send the standby clock signal carrying quality level do not use information QL_DNU by using the bidirectional clock tracking link respectively corresponding to each of the clock signals in the clock source group to which the currently tracked clock signal belongs.

To sum up, in the network element provided by this embodiment, by setting two or more clock signals coming from the same network element into the clock source group, and when tracking one clock signal in the clock source group, respectively sending the standby clock signal carrying quality level do not use information QL_DNU back to the bidirectional clock tracking link corresponding to each of the clock signals in the clock source group, the problem in the prior art that the generation of a clock tracking loop cannot be avoided in the scenario where there are two or more bidirectional clock tracking links between two network elements is solved; and the effect that in the scenario where there are two or more bidirectional clock tracking links between two network elements, the clock tracking loop will not be generated even if a certain bidirectional clock tracking link fails or the clock quality level of the clock signal therein is declined is achieved.

As a more preferred embodiment, on the basis of the embodiment shown in FIG. 11, the processor is specifically configured to select one clock signal from the at least two clock signals as the currently tracked clock signal according to a clock priority and/or clock quality level information corresponding to each of the clock signals.

The processor is further configured to, if the currently tracked clock signal belongs to the clock source group, and the currently tracked clock signal is lost or a clock quality level thereof is declined, re-select another clock signal in the clock source group as the currently tracked clock signal according to the clock priority and/or clock quality level information corresponding to each of the clock signals.

The transmitter is further configured to, if the currently tracked clock signal belongs to the clock source group, and clock switching protection occurs when clock quality level information of all the clock signals in the clock source group to which the currently tracked clock signal belongs is lower than the clock quality level information of the standby clock signal, respectively send the standby clock signal carrying switched clock quality level information by using the bidirectional clock tracking link respectively corresponding to each of the clock signals in the clock source group to which the currently tracked clock signal belongs.

In this way, by still respectively sending the standby clock signal carrying the same clock quality level back to the bidirectional clock tracking link corresponding to each of the clock signals in the clock source group during the clock switching protection, the network element further achieves the effect that in the scenario where there are two or more bidirectional clock tracking links between two network elements, the clock tracking loop will not be generated either even if the clock protection switching is needed.

An embodiment of the present invention further provides a system for synchronizing clocks. The system for synchronizing clocks includes two or more network elements, in which at least one network element is the network element provided by the apparatus embodiments herein.

The sequence numbers of the embodiment described above are only for describing, but not representing the preference of the embodiments.

Persons skilled in this art can understand that: the implementation of all or part of the steps in the above embodiments can be completed by hardware, or by hardware related to program instructions. The program may be stored in a computer readable storage medium, and the storage medium may be a read only memory ROM, a magnetic disk or an optical disk, etc.

The foregoing embodiments are only preferred embodiments of the present invention other than limiting the present invention. Any modification, substitution, improvement and the like made without departing from the essence and principle of the present invention should all be covered in the protection scope of the present invention.

What is claimed is:

1. A method for synchronizing clocks of network elements having bidirectional clock tracking links, comprising:
   receiving, by a network element, a plurality of clock signals via respective bidirectional clock tracking links, wherein the plurality of clock signals comprise a first standby clock signal;
   setting, by the network element, two or more clock signals of the plurality of clock signals into a clock source group, wherein the two or more clock signals come from another network element;
   selecting, by the network element, a clock signal from the two or more clock signals as a currently tracked clock signal; and
   sending, by the network element, a second standby clock signal carrying quality level do not use information (QL_DNU) via bidirectional clock tracking links corresponding to each of the clock signals in the clock source group.

2. The method according to claim 1, wherein selecting the clock signal as the currently tracked clock signal is based on clock priority and/or clock quality level information corresponding to clock signals of the clock source group.

3. The method according to claim 1, further comprising:
   determining that the currently tracked clock signal is lost or a clock quality level of the currently tracked clock signal is declined; and
   re-selecting, in response to determining that the currently tracked clock signal is lost or the clock quality level of the currently tracked clock signal is declined, another clock signal in the clock source group as the currently tracked clock signal according to clock priority and/or clock quality level information corresponding to clock signals of the clock source group.

4. The method according to claim 1, further comprising:
   determining that clock quality level information of all the clock signals in the clock source group is lower than clock quality level information of the first standby clock signal; and
   sending, in response to determining that the clock quality level information of all the clock signals in the clock source group is lower than the clock quality level information of the first standby clock signal, a third standby clock signal carrying switched clock quality level information via the bidirectional clock tracking links corresponding to each of the clock signals in the clock source group.

5. A network element, comprising a processor and a non-transitory computer-readable medium having processor-executable instructions stored thereon, wherein the processor-executable instructions, when executed by the processor, facilitate:
   receiving a plurality of clock signals via respective bidirectional clock tracking links, wherein the plurality of clock signals comprise a first standby clock signal;
   setting two or more clock signals of the plurality of clock signals into a same clock source group, wherein the two or more clock signals come from another network element;
   selecting a clock signal from the two or more clock signals as a currently tracked clock signal; and
   sending a second standby clock signal carrying quality level do not use information (QL_DNU) via bidirectional clock tracking links corresponding to each of the clock signals in the clock source group.

6. The network element according to claim 5, wherein selection of the clock signal as the currently tracked clock signal is based on clock priority and/or clock quality level information corresponding to clock signals of the clock source group.

7. The network element according to claim 5, wherein the processor-executable instructions, when executed, further facilitate:
   determining that the currently tracked clock signal is lost or a clock quality level of the currently tracked clock signal is declined, and re-select another clock signal in the clock source group as the currently tracked clock signal according to clock priority and/or clock quality level information corresponding to clock signals of the clock source group.

8. The network element according to claim 5, wherein the processor-executable instructions, when executed, further facilitate:
   determining that clock quality level information of all clock signals in the clock source group is lower than a clock quality level information of the first standby clock signal, and sending a third standby clock signal carrying switched clock quality level information via bidirectional clock tracking links corresponding to each of the clock signals in the clock source group.

9. A system for synchronizing clocks, comprising: at least one network element according to claim 5.

10. A network element, comprising:
    a receiver, configured to receive a plurality of clock signals via respective bidirectional clock tracking links, wherein the plurality of clock signals comprise a first standby clock signal;
    a processor, configured to set two or more clock signals of the plurality of clock signals into a same clock source group, wherein the two or more clock signals come from another network element, and to select a clock signal from the two or more clock signals as a currently tracked clock signal; and
    a transmitter, configured to send a second standby clock signal carrying quality level do not use information (QL_DNU) via bidirectional clock tracking links corresponding to each of the clock signals in the clock source group.

11. The network element according to claim 10, wherein selection of the clock signal as the currently tracked clock signal is based on clock priority and/or clock quality level information corresponding to clock signals of the clock source group.

12. The network element according to claim 10, wherein the processor is further configured to determine that the currently tracked clock signal is lost or a clock quality level of the currently tracked clock signal is declined, and to re-select another clock signal in the clock source group as the currently tracked clock signal according to clock priority and/or clock quality level information corresponding to clock signals of the clock source group.

13. The network element according to claim 10, wherein the processor is further configured to determine that clock quality level information of all clock signals in the clock source group is lower than a clock quality level information of the first standby clock signal; and
    wherein the transmitter is further configured to send a third standby clock signal carrying switched clock quality level information via bidirectional clock tracking links corresponding to each of the clock signals in the clock source group.

14. A system for synchronizing clocks, comprising: at least one network element according to claim 10.

* * * * *

UNITED STATES PATENT AND TRADEMARK OFFICE
CERTIFICATE OF CORRECTION

PATENT NO.       : 9,641,268 B2
APPLICATION NO.  : 14/671975
DATED            : May 2, 2017
INVENTOR(S)      : Li et al.

Page 1 of 1

It is certified that error appears in the above-identified patent and that said Letters Patent is hereby corrected as shown below:

In the Specification

Column 19, Line 21, "(QL DNU)" should read -- (QL_DNU) --.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*